US 9,446,963 B2

United States Patent
Cho et al.

(10) Patent No.: US 9,446,963 B2
(45) Date of Patent: Sep. 20, 2016

(54) SYSTEM AND METHODS FOR A CATHODE ACTIVE MATERIAL FOR A LITHIUM ION BATTERY CELL

(71) Applicant: Johnson Controls Technology LLC, Wilmington, DE (US)

(72) Inventors: Sung-Jin Cho, Milwaukee, WI (US); Frederic C. Bonhomme, Thiensville, WI (US)

(73) Assignee: Johnson Controls Technology Company, Holland, MI (US)

( * ) Notice: Subject to any disclaimer, the term of this patent is extended or adjusted under 35 U.S.C. 154(b) by 488 days.

(21) Appl. No.: 13/910,672

(22) Filed: Jun. 5, 2013

(65) Prior Publication Data

US 2013/0327993 A1 Dec. 12, 2013

Related U.S. Application Data

(60) Provisional application No. 61/656,401, filed on Jun. 6, 2012.

(51) Int. Cl.
*H01M 4/88* (2006.01)
*C01D 15/02* (2006.01)
(Continued)

(52) U.S. Cl.
CPC .............. *C01D 15/02* (2013.01); *B60L 11/123* (2013.01); *B60L 11/14* (2013.01); *B60L 11/1875* (2013.01); *B60L 11/1877* (2013.01); *B60L 11/1879* (2013.01); *H01M 4/131* (2013.01); *H01M 4/1391* (2013.01); *H01M 4/364* (2013.01); *H01M 4/485* (2013.01); *B60L 2240/545* (2013.01); *H01M 4/043* (2013.01); *H01M 4/0404* (2013.01); *H01M 4/0409* (2013.01); *H01M 4/505* (2013.01); *H01M 4/525* (2013.01); *H01M 2004/021* (2013.01); *Y02E 60/122* (2013.01);
(Continued)

(58) Field of Classification Search
CPC . H01M 4/131; H01M 4/1391; H01M 2/1686
USPC .............. 252/182.1; 429/94, 207, 218.1, 223
See application file for complete search history.

(56) References Cited

U.S. PATENT DOCUMENTS 6,753,110 B1    6/2004  Yoo et al.
7,816,033 B2 *  10/2010  Ryu .................... H01M 4/1315
                                                     429/218.1

(Continued)

FOREIGN PATENT DOCUMENTS

EP    1394876 A1    3/2004
EP    1637503 A1    3/2006
(Continued)

OTHER PUBLICATIONS

Battery Test Manual for Low-Energy Energy Storage System for Power-Assist Hybrid Electric Vehicles; U.S. Department of Energy Vehicle Technologies Program;The Idaho National Laboratory is a U.S. Department of Energy National Laboratory Operated by Battelle Energy Alliance; Apr. 2013, pp. 1-56.

*Primary Examiner* — Khanh Tuan Nguyen
(74) *Attorney, Agent, or Firm* — Fletcher Yoder, P.C.

(57) ABSTRACT

A material includes a first lithium metal oxide (LMO) component formed using a spray-dry technique and a second LMO component formed using a co-precipitation technique. In particular, the LMO components may include lithium nickel manganese cobalt oxide (NMC). The material may further include a binder and a conductive component.

21 Claims, 7 Drawing Sheets

(51) Int. Cl.
*H01M 4/131* (2010.01)
*H01M 4/1391* (2010.01)
*H01M 4/36* (2006.01)
*H01M 4/485* (2010.01)
*B60L 11/12* (2006.01)
*B60L 11/14* (2006.01)
*B60L 11/18* (2006.01)
*H01M 4/04* (2006.01)
*H01M 4/505* (2010.01)
*H01M 4/525* (2010.01)
*H01M 4/02* (2006.01)

(52) U.S. Cl.
CPC .............. *Y02P 70/54* (2015.11); *Y02T 10/6217* (2013.01); *Y02T 10/705* (2013.01); *Y02T 10/7005* (2013.01); *Y02T 10/7011* (2013.01); *Y02T 10/7077* (2013.01); *Y10T 29/4911* (2015.01)

(56) References Cited

U.S. PATENT DOCUMENTS

| | | |
|---|---|---|
| 2010/0081055 A1 | 4/2010 | Konishi et al. |
| 2010/0221609 A1* | 9/2010 | Konishi ............... H01M 4/131 |
| | | 429/223 |
| 2012/0052391 A1 | 3/2012 | Suzuki et al. |
| 2012/0282522 A1 | 11/2012 | Axelbaum et al. |
| 2013/0011740 A1 | 1/2013 | Konishi et al. |

FOREIGN PATENT DOCUMENTS

| | | |
|---|---|---|
| WO | 0128010 A1 | 4/2001 |
| WO | 2004099082 A1 | 11/2004 |
| WO | 2006037205 A1 | 4/2006 |
| WO | 2008067677 A1 | 6/2008 |

\* cited by examiner

SYSTEM AND METHODS FOR A CATHODE ACTIVE MATERIAL FOR A LITHIUM ION BATTERY CELL

CROSS REFERENCE TO RELATED APPLICATIONS

This application claims priority from and the benefit of U.S. Provisional Application Ser. No. 61/656,401, entitled "CATHODE ACTIVE MATERIAL FOR LITHIUM SECONDARY BATTERY", filed Jun. 6, 2012, which is hereby incorporated by reference in its entirety for all purposes.

BACKGROUND

The present disclosure relates generally to the field of batteries and battery modules. More specifically, the present disclosure relates to battery cells that may be used in vehicular contexts (e.g., xEVs), as well as other energy storage/expending applications.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Vehicles using electric power for all or a portion of their power (e.g., electric vehicles (EVs), hybrid electric vehicles (HEVs), plug-in hybrid electric vehicles (PHEVs), microhybrid electric vehicles (MHEVs), and the like, collectively referred to herein as "electric vehicles" (xEVs)) may provide a number of advantages compared to more traditional gas-powered vehicles using internal combustion engines. For example, electric vehicles may produce fewer undesirable emission products and may exhibit greater fuel efficiency as compared to vehicles using internal combustion engines. Further, in some cases, certain xEVs may eliminate the use of gasoline entirely, as is the case of certain types of xEVs.

As electric vehicle technology continues to evolve, there is a need to provide improved power sources (e.g., battery systems or modules) for such vehicles. For example, it is desirable to increase the distance that such vehicles may travel without the need to recharge the batteries. Additionally, it may also desirable to improve the performance of such batteries and to reduce the cost associated with the battery systems.

SUMMARY

Certain embodiments commensurate in scope with the originally claimed subject matter are summarized below. These embodiments are not intended to limit the scope of the claimed invention, but rather these embodiments are intended only to provide a brief summary of possible forms of the invention. Indeed, the present disclosure may encompass a variety of forms that may be similar to or different from the embodiments set forth below.

The present disclosure relates to batteries and battery modules. More specifically, the present invention relates to lithium ion battery cells that may be used in vehicular contexts (e.g., xEVs) as well as other energy storage/expending applications (e.g., energy storage for an electrical grid).

In an embodiment, a lithium ion battery cell includes a cathode having an active material. The active material includes a first lithium metal oxide (LMO) component prepared via a spray-dry technique. The active material also includes a second LMO component prepared via a co-precipitation technique.

In another embodiment, a method of making a cathode of a battery cell includes mixing a spray-dried lithium metal oxide (LMO) component and a co-precipitated LMO component. The method further includes binding the mixed spray-dried and co-precipitated components to a metallic surface.

In another embodiment, a material includes a first lithium metal oxide (LMO) component formed using a spray-dry technique and a second LMO component formed using a co-precipitation technique. In particular, the LMO components may be lithium nickel manganese cobalt oxide (NMC) components. The material may further include a binder and a conductive component.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned, battery systems may be used to provide power to a number of different types of xEV vehicles as well as other energy storage applications (e.g., electrical grid power storage systems). Such battery systems may include a number of battery modules, each battery module having a number of battery cells (e.g., electrochemical cells). Further, each battery cell may generally include a cathode active material to enable the cathode to store and transfer ions (e.g., lithium ions) during charging and discharging cycles. The power characteristics (e.g., power retention, cycle life, and so forth) of each battery cell may depend, at least in part, on the porosity and the robustness of the cathode active material.

Accordingly, presently disclosed are a number of systems and methods for the manufacture of battery cells. As discussed in detail below, present embodiments are directed toward utilizing mixtures of spray dried and co-precipitated lithium metal oxide (LMO) components to form the cathode active material for a battery cell. As used herein, lithium metal oxides (LMOs) may refer to any class of materials whose formula includes lithium and oxygen as well as one or more additional metal species (e.g., nickel, cobalt, manganese, aluminum, iron, or another suitable metal). A non-limiting list of example LMOs may include: lithium nickel cobalt manganese oxide (NMC) (e.g., $LiNiCoMnO_2$), lithium nickel cobalt aluminum oxide (NCA) (e.g., $LiNiCoAlO_2$), lithium cobalt oxide (LCO) (e.g., $LiCoO_2$), and lithium metal oxide spinel (LMO-spinel) (e.g., $LiMn_2O_4$). As discussed below, mixtures of spray dried and co-precipitated LMO components may provide material having a particular desired tap density, surface area, and pore size. Accordingly, as set forth below, a cathode using the disclosed mixed active material may improve power capability of the battery cell (e.g., at room temperature and low temperatures). Further, as discussed below, the mixed active material may enable cathodes having significantly enhanced power compared to active materials formed using co-precipitation alone. In addition, the mixed active material may also improve power retention of the battery cell (e.g., during storage at high temperature). As such, the mixed LMO components may generally enable a more robust cathode active material that reduces cycle fade (e.g., during high temperature cycling) and improves power capability at a wide range of temperatures.

Figure 1:
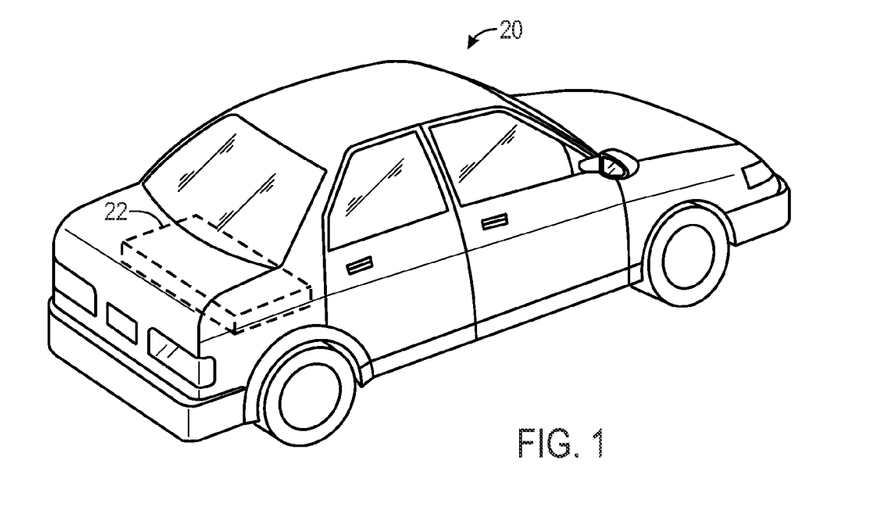
FIG. 1 is a perspective view of an embodiment of a vehicle, an xEV, having a battery module contributing all or a portion of the power for the vehicle, in accordance with an embodiment of the present approach.

With the foregoing in mind, FIG. 1 is a perspective view of an xEV 20 in the form of an automobile (e.g., a car) having a battery system 22 for providing all or a portion of the power (e.g., electrical power and/or motive power) for the vehicle 20. Such an xEV 20 may be an electric vehicle (EV), a hybrid electric vehicle (HEV), a plug-in hybrid electric vehicle (PHEV), a microhybrid electric vehicle (MHEV), or other type of vehicle using electric power for at least a portion of the propulsion power. For example, the xEV 20 may be a MHEV including a combustion engine equipped with a start-stop system that may utilize the battery system 22 power at least one or more accessories (e.g., AC, lights, consoles, etc.), as well as the ignition of the combustion engine, during start-stop cycles.

Further, although the vehicle 20 is illustrated as a car in FIG. 1, the type of vehicle may differ in other embodiments, all of which are intended to fall within the scope of the present disclosure. For example, the vehicle 20 may be a truck, bus, industrial vehicle, motorcycle, recreational vehicle, boat, or any other type of vehicle (e.g., xEV 20) that may benefit from the use of electric power for all or a portion of its propulsion power. Additionally, while the battery system 22 is illustrated in FIG. 1 as being positioned in the trunk or rear of the vehicle, according to other embodiments, the location of the battery system 22 may differ. For example, the position of the battery system 22 may be selected based on the available space within a vehicle, the desired weight balance of the vehicle, the location of other components used with the battery system 22 (e.g., battery management systems, vents or cooling devices, etc.), and a variety of other considerations.

Figure 2:
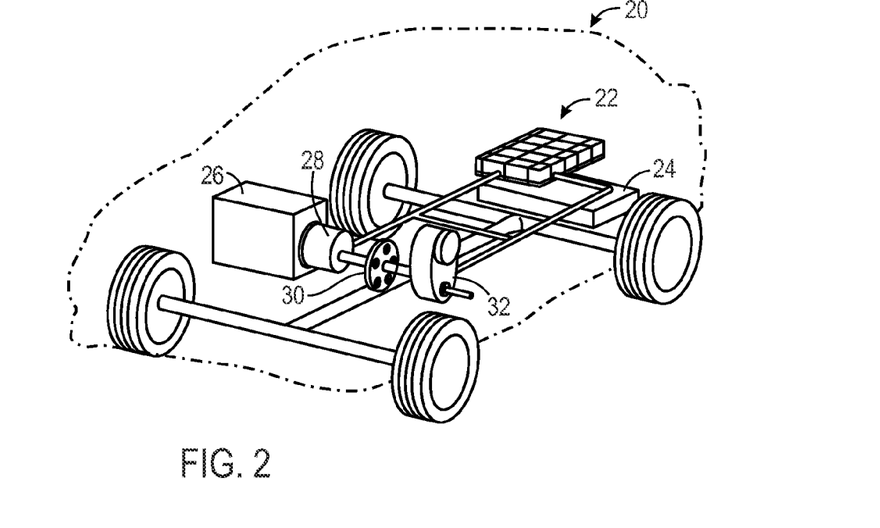
FIG. 2 illustrates a cutaway schematic view of an embodiment of the vehicle of FIG. 1 provided in the form of a hybrid electric vehicle, in accordance with an embodiment of the present approach.

FIG. 2 illustrates a cutaway schematic view of a vehicle 20 provided in the form of an xEV (e.g., a HEV) having a battery system 22, in accordance with an embodiment of the present approach. In particular, the battery system 22 illustrated in FIG. 2 is disposed toward the rear of the vehicle 20 proximate a fuel tank 24. In other embodiments, the battery system 22 may be provided immediately adjacent the fuel tank 24, provided in a separate compartment in the rear of the vehicle 20 (e.g., a trunk), or may provided in another suitable location in the vehicle 20. Further, as illustrated in FIG. 2, an internal combustion engine 26 may be provided for times when the vehicle 20 utilizes gasoline power to propel the vehicle 20. The vehicle 20 also includes an electric motor 28, a power split device 30, and a generator 32 as part of the drive system.

The xEV vehicle 20 illustrated in FIG. 2 may be powered or driven by the battery system 22 alone, by the engine 26 alone, or by both the battery system 22 and the engine 26. It should be noted that, in other embodiments of the present approach, other types of vehicles and configurations for the vehicle drive system may be utilized, and that the schematic illustration of FIG. 2 should not be considered to limit the scope of the subject matter described in the present application. According to various embodiments, the size, shape, and location of the battery system 22, the type of vehicle 20, the type of xEV vehicle technology (e.g., EV, HEV, PHEV, MHEV, etc.), and the battery chemistry, among other features, may differ from those shown or described.

The battery system 22 generally includes a plurality of battery cells (e.g., electrochemical cells), discussed in greater detail below. The battery system 22 may also include features or components for connecting the electrochemical cells to each other and/or to other components of the vehicle electrical system, and also for regulating the electrochemical cells and other features of the battery system 22. For example, the battery system 22 may include features that are responsible for monitoring and controlling the electrical performance of the battery system 22, managing the thermal behavior of the battery system 22, containment and/or routing of effluent (e.g., gases that may be vented from an electrochemical cell through a vent), and other aspects of the battery system 22.

Figure 3:
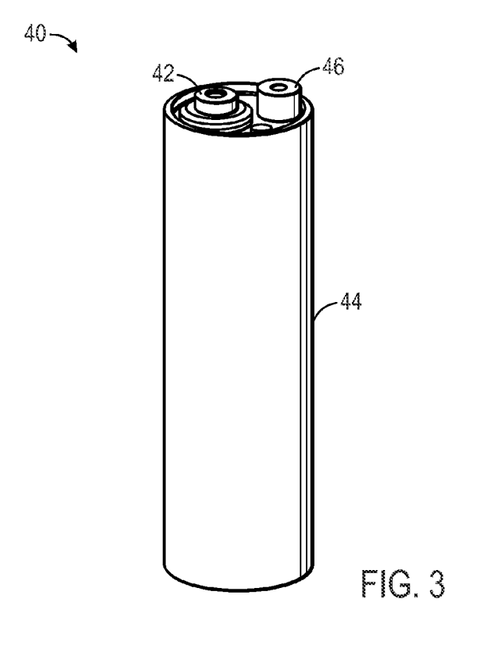
FIG. 3 is a perspective view of a cylindrical battery cell, in accordance with an embodiment of the present approach.
Figure 4:
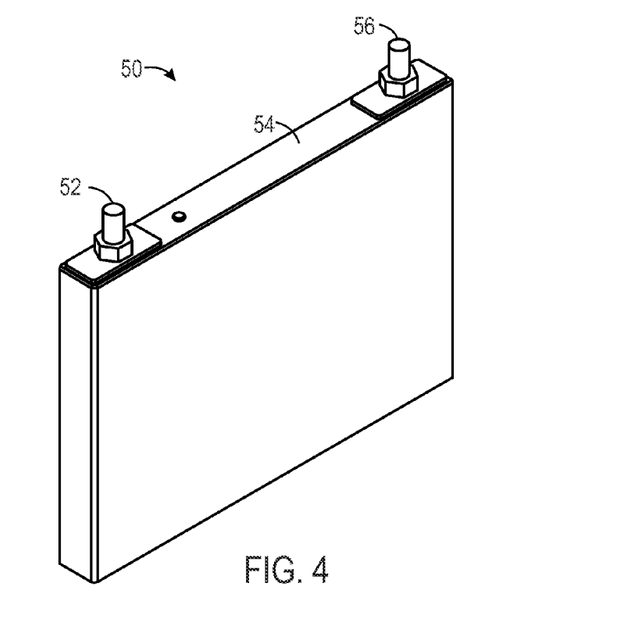
FIG. 4 is a perspective view of a prismatic battery cell, in accordance with an embodiment of the present approach.
Figure 5:
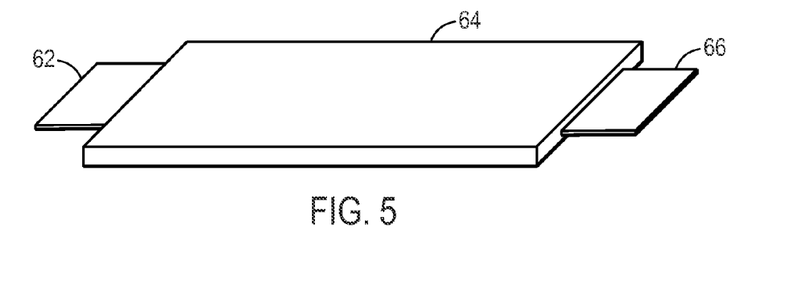
FIG. 5 is a perspective view of a pouch battery cell, in accordance with an embodiment of the present approach.

With the foregoing in mind, FIGS. 3-5 illustrate embodiments of battery cells that may include the mixed cathode active material of the present approach. That is, in certain embodiments, the battery system 22 illustrated in FIGS. 1 and 2 may include a suitable number (e.g., 2, 3, 4, 5, 6, 7, 8, 9, 10, or more) of the battery cells of FIGS. 3-5, each configured to store an electrical charge. It should be appreciated that the battery cells illustrated in FIGS. 3-5 are merely provided as examples. In other embodiments, other shapes (e.g., oval, prismatic, polygonal, etc.), sizes, terminal configuration, and other features may also be used for battery cells without spoiling the effect of the present approach.

FIG. 3 illustrates a cylindrical lithium ion battery cell 40 according to one example embodiment of the present approach. The illustrated cylindrical lithium ion battery cell 40 includes a negative terminal 42 that is coupled to an anode disposed within the housing 44 of the battery cell 40. The illustrated cylindrical lithium ion battery cell 40 also includes a positive terminal 46 coupled to the cathode that is also disposed within the housing 44 of the battery cell 40. For the illustrated cylindrical lithium ion battery cell 40, the anode and cathode may be in the form of a cylindrical coil discussed below. Further, the active material of the cathode of the battery cell 40 may include a mixture of both spray-dried and co-precipitated LMO components to improve the power capability and cycle life of the battery cell 40.

FIG. 4 illustrates a prismatic lithium ion battery cell 50 according to another example embodiment of the present approach. The illustrated prismatic lithium ion battery cell 50 includes a negative terminal 52 that is coupled to an anode disposed within the housing 54 of the battery cell 50. The illustrated prismatic lithium ion battery cell 40 also includes a positive terminal 56 coupled to the cathode that is also disposed within the housing 54 of the battery cell 50. For the illustrated prismatic lithium ion battery cell 50, the anode and cathode may be in the form of an oblong coil or as a series of stacked plates discussed below. Further, the active material of the cathode of the battery cell 50 may include a mixture of both spray-dried and co-precipitated LMO components to improve the power capability and cycle life of the battery cell 50.

FIG. 5 illustrates a pouch lithium ion battery cell 60 according to another example embodiment of the present approach. The illustrated pouch lithium ion battery cell 60 includes a negative tab terminal 62 that is coupled to an anode disposed within the non-conductive polymer pouch 64 of the battery cell 60. The illustrated pouch lithium ion battery cell 60 also includes a positive tab terminal 66 coupled to the cathode that is also disposed within the polymer pouch 64 of the battery cell 60. For the illustrated pouch lithium ion battery cell 60, the anode and cathode may be in the form of an oblong coil discussed below. Further, the active material of the cathode of the battery cell 60 may include a mixture of both spray-dried and co-precipitated LMO components to improve the power capability and cycle life of the battery cell 60.

Figure 6:
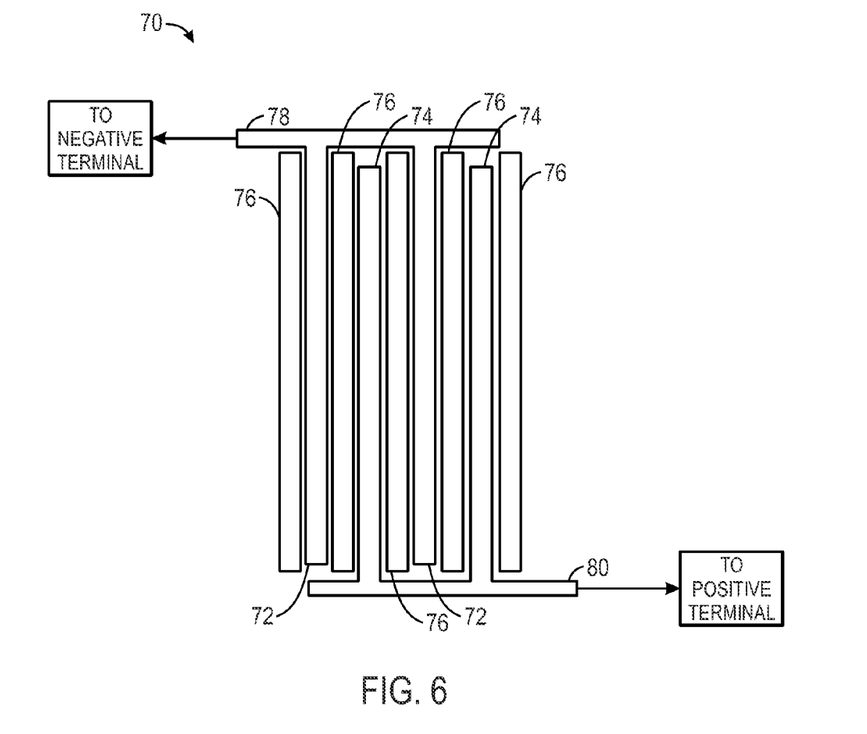
FIG. 6 is a schematic of an embodiment of a stack of anode layers, non-conductive layers, and cathode layers.

To better illustrate a general structure of the anodes and cathodes of each of the battery cell embodiments 40, 50, and 60, FIG. 6 illustrates a schematic of a stack 70 an anode layers 72 and cathode layers 74 that may be disposed within a lithium ion battery cell (e.g., battery cells 40, 50, or 60). As illustrated by FIG. 6, the stack 70 includes alternating anode layers 72 and cathode layers 74 with non-conductive layers 76 disposed between each anode and cathode layer. This alternating stack 70 may be formed in a number of ways. For example, in certain embodiments, the alternating stack 70 may be formed by stacking an anode layer 72 (e.g., a strip of copper foil with an active material), one or more non-conductive layers 76, and the cathode layer (e.g., a strip of aluminum foil with an active material), and then winding the stack (e.g., about a mandrel) to form a cylindrical or oblong coil. In other embodiments, the stack 70 may be constructed as a stack of alternating anode plates 72 (e.g., copper plates coated with an active material) and cathode plates 74 (e.g., aluminum plates coated with an active material) that are separated from one another by non-conductive layers or plates 76. Regardless of whether the stack 70 is achieved via a coil or stacked plates, the anode layers 72 may be electrically coupled to one another and to the negative terminal (e.g., negative terminals 42, 52, and 62 of battery cells 40, 50, and 60, respectively) via a negative current collector feature 78. Similarly, the cathode layers 74 may be electrically coupled to one another and to the positive terminal (e.g., positive terminals 42, 52, and 66 of battery cells 40, 50, and 60, respectively) via a positive current collector feature 80.

As mentioned above, the cathode 74 of the lithium ion battery cells 40, 50, and 60 may be formed into the stack 70 using a strip of metallic foil (e.g., strips of aluminum foil) or a number of metallic plates (e.g., aluminum plates) that are coated with an active material that facilitates the storage and movement of metal ions (e.g., Li+) as the battery is being charged and drained. It may be appreciated that the components of the cathode active material (e.g., the LMO component) may have a number of physical and chemical properties that may affect the performance of the resulting battery cell. As such, set forth below are examples of forming and using mixtures of LMO components that are, more specifically, lithium nickel manganese cobalt oxide (NMC) materials manufactured using both spray drying and co-precipitation techniques. It should be noted that the NMC materials presented below merely serve as examples of LMO components, and that, in certain embodiments, other LMO materials (e.g., NCA, LCO, LMO-spinel, or another suitable LMO) may be used without spoiling the effect of the present approach.

As indicated in Table 1, a co-precipitated NMC material may be relatively dense (e.g., may provide a tap density greater than approximately 1.9 $g/cm^3$), and may provide relatively small, densely packed pores. In contrast, the spray-dried NMC material indicated in Table 1 may be relatively less dense (e.g., may provide a tap density less than approximately 2.2 g/cm$^3$), and may provide relatively larger pore sizes. Additionally, the co-precipitated NMC material may have a surface area (e.g., based on Brunauer-Emmett-Teller (BET) measurements) between approximately 0.3 m$^2$/g and approximately 0.6 m$^2$/g, while the spray-dried NMC material may have a surface area greater than approximately 0.7 m$^2$/g. Further, it may be appreciated that, while the co-precipitated NMC material may provide a smaller pore size than the spray-dried NMC material, the mixed NMC material enables pore sizes ranging from medium to large (e.g., based on the packing of the co-precipitated NMC material and the spray-dried NMC material of the mixture).

TABLE 1

Physical Characteristics of NMC materials.

| Specification | Co-precipitation | Spray-Dry | Mixture (1:1) |
| --- | --- | --- | --- |
| Tap Density(g/cm$^3$) | 1.9-2.6 | <2.2 | 2.6 > x > 1.9 |
| Surface Area (m$^2$/g) | 0.3-0.6 | >0.7 | 1.0 > x > 0.4 |
| Pore size | Small | Medium | Medium-Large (Adjustable) |

As also indicated in Table 1, a mixed NMC material may also be used to manufacture a cathode active material. For the example embodiment illustrated by Table 1, a 1:1 mixture of co-precipitated and spray-dried NMC components may provide a tap density that is generally greater than that of the spray-dried NMC component and is generally less than that of the co-precipitated component. Further, the mixed NMC material may have a relatively large pore size, similar to that of the spray-dried NMC material. Further, like the spray-dried NMC material, the large pore size of the mixed NMC material may enable the cathode to efficiently gain and lose lithium ions during battery cycling. Additionally, like the co-precipitated NMC material, the mixed NMC material may be robust and provide improved stability in the performance of the battery cell over successive cycling. Accordingly, as discussed in greater detail below, using the mixed NMC material to manufacture the cathode active material may provide performance advantages over using the spray-dried or co-precipitated NMC components alone.

It may be appreciated that, while the examples discussed herein refer to a 1:1 mixture of spray-dried and co-precipitated NMC components, other mixtures are presently contemplated. For example, in other embodiments, the mixture may be have a spray-dried NMC to co-precipitated NMC ratio (or, alternatively, a co-precipitated NMC to spray-dried NMC ratio) of approximately 1:2, approximately 1:3, approximately 1:4, approximately 1:5, approximately 1:6, approximately 1:7, approximately 1:8, approximately 1:9, approximately 1:10 or more. By further example, in certain embodiments one component (e.g., the co-precipitated NMC or the spray-dried NMC) of the mixture may account for between approximately 99% and approximately 1% (e.g., between approximately 5% and approximately 95%, between approximately 10% and approximately 90%, between approximately 20% and approximately 80%, between approximately 30% and approximately 70%, or between approximately 40% and approximately 60%) of the mixture by weight. By still further example, in certain embodiments, the co-precipitated NMC or the spray-dried NMC may account for greater than approximately 5%, approximately 10%, approximately 15%, approximately 20%, approximately 25%, approximately 30%, approximately 35%, approximately 40%, approximately 45%, or approximately 50% of the mixture by weight.

Figure 7:
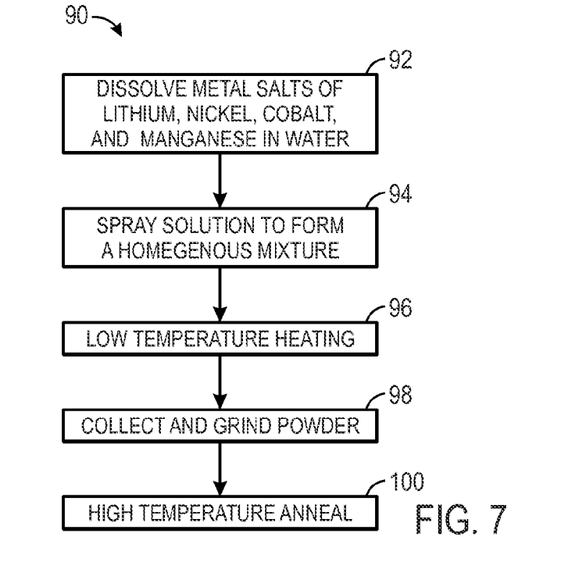
FIG. 7 is a flow diagram illustrating an embodiment of a process for manufacturing a spray-dried lithium nickel manganese cobalt oxide (NMC) component.

FIG. 7 is a flow diagram illustrating an embodiment of a spray-dry process 90 by which a spray-dried NMC component may be manufactured. Further, example 1, set forth below, describes a specific example of manufacturing an embodiment of a spray-dried NMC component. With the foregoing in mind, the spray-dry process 90 illustrated in FIG. 7 begins with dissolving (block 92) metal salts (e.g., acetates, sulfates, halides, or another suitable salt) of lithium, nickel, cobalt, and manganese in water to form a solution. The solution may then be sprayed (block 94) onto a surface at a particular temperature (e.g., approximately 100° C. to approximately 200° C.) to form a homogenous mixture. The mixture may be heated (block 96) to a relatively lower temperature (e.g., approximately 300° C.-approximately 500° C.) for a certain amount of time (e.g., 2 to 8 hours) before the powder is collected (block 98) and ground into a fine powder. The fine powder may then be annealed (block 100) at a higher temperature (e.g., approximately 800° C. to approximately 1000° C.) for a certain amount of time (e.g., approximately 8 to approximately 30 hours) to provide the spray-dried NMC component.

EXAMPLE 1

Synthesis of a Spray-Dried NMC Component

For an embodiment of the spray-drying process illustrated in FIG. 7, a spray-dried NMC component, LiNi$_x$Co$_y$Mn$_z$O$_2$, in which x=y=z=1/3, was prepared using the following metal salts: LiCH$_3$COO.2H$_2$O, Ni(CH$_3$COO)$_2$.4H$_2$O, Co(CH$_3$COO)$_2$.4H$_2$O, Mn(CH$_3$COO)$_2$.4H$_2$O. The metal acetates were combined with a molar ratio of approximately Li/Me=1.1, wherein Me is nickel, cobalt, and manganese, and dissolved in deionized water. The resulting solution was sprayed to form a homogeneous mixture of precursors at 150° C. The mixed precursor powder was heated to 400° C. for 4 hours in air. Then, the obtained powder was ground in a mortar and annealed at 900° C. for 15 hours in air to provide the spray-dried NMC component.

Figure 8:
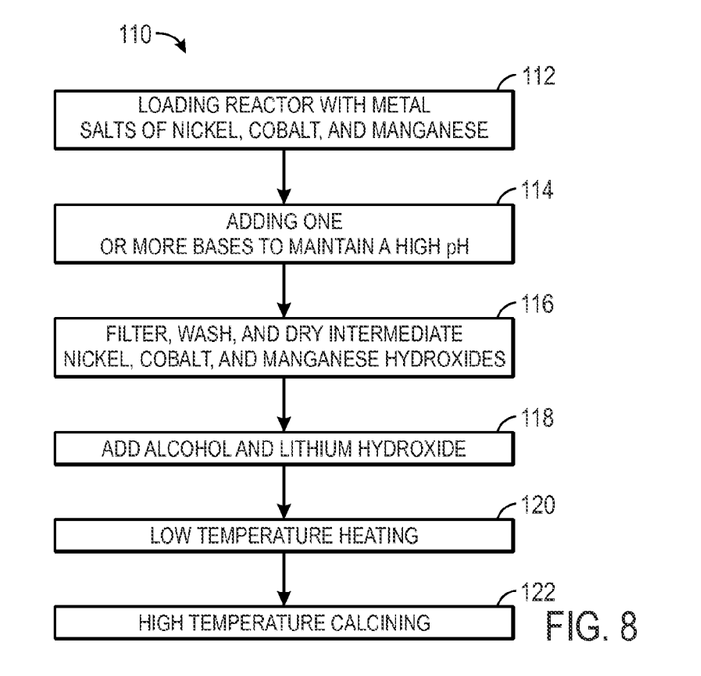
FIG. 8 is a flow diagram illustrating an embodiment of a process for manufacturing a co-precipitated NMC component.

FIG. 8 is a flow diagram illustrating an embodiment of a co-precipitation process 110 by which a co-precipitated NMC component may be manufactured. Further, example 2, set forth below, describes a specific example of manufacturing an embodiment of a co-precipitated NMC component. With the foregoing in mind, the co-precipitation process 110 illustrated in FIG. 8 begins with loading (block 112) a reactor with metal salts (e.g., sulfates, acetates, halides, or another suitable salt) of nickel, cobalt, and manganese. Additionally, one or more bases and/or chelating agents (e.g., sodium hydroxide, ammonium hydroxide, or other suitable bases/chelating agents) may be added (block 114) to maintain a high pH (e.g., greater than 11). Subsequently, the intermediate nickel, cobalt, and manganese hydroxides may be filtered (block 116), washed with water, and dried (e.g., at or above approximately 100° C.). An alcohol (e.g., ethanol, methanol, or isopropyl alcohol) and lithium hydroxide may be added (block 118) to the hydroxides form a mud-like mixture. This mixture may then undergo a low temperature heating (e.g., a preheating at approximately 400° C. to approximately 600° C.) (block 120), and may also undergo a calcination (e.g., at approximately 700° C. to approximately 1000° C.) (block 122) to provide the co-precipitated NMC component.

EXAMPLE 2

Synthesis of a Co-Precipitated NMC Component

For an embodiment of the co-precipitation process 110 illustrated in FIG. 8, a co-precipitated NMC component, $LiNi_xCo_yMn_zO_2$, in which $x=y=z=1/3$, was formed using the metal salts $MnSO_4.H_2O$, $NiSO_4.6H_2O$, and $CoSO_4.7H_2O$ as starting materials. At the same time, NaOH and $NH_4OH$ bases/chelating agents were fed into the reactor in appropriate amounts such that the pH was maintained in the range of 11-11.5. After co-precipitation, $(Ni, Co, Mn)(OH)_2$ precursors were filtered, washed five times with distilled water, and then dried at 100° C. for 24 hours. Ethanol and lithium hydroxide was added to form a mud-like mixture. Subsequently, the mixture was preheated at 500° C. for 5 h and then calcined at between approximately 800° C. to 900° C. for 3 hours in air to provide the co-precipitated NMC component.

Figure 9:
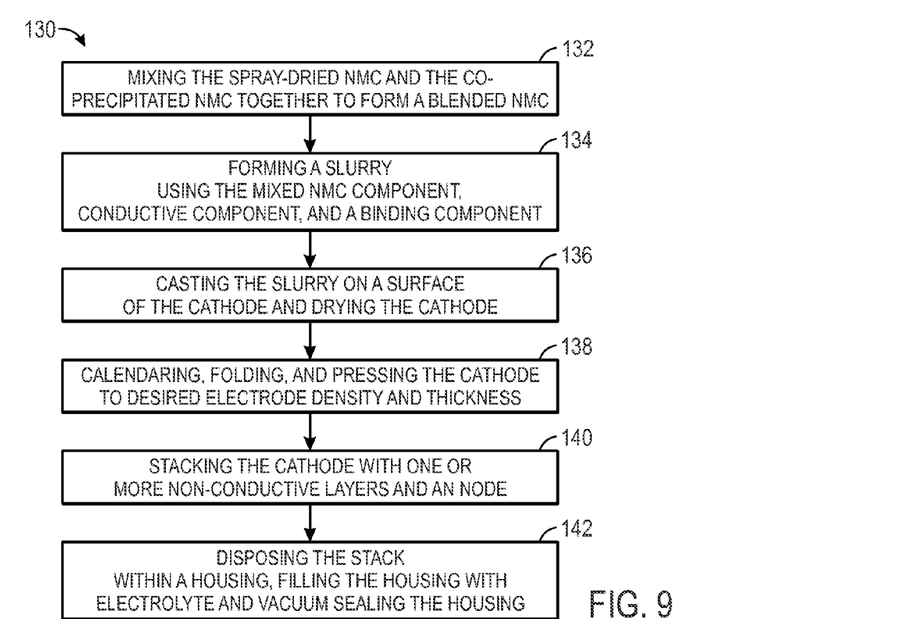
FIG. 9 is a flow diagram illustrating an embodiment of a process for manufacturing battery cell having a cathode active material having a mixed NMC component, which is a mix of both the spray-dried and the co-precipitated NMC components.

FIG. 9 is a flow diagram illustrating an embodiment of a process 130 by which a battery cell may be manufactured using the aforementioned mixed cathode active material. Further, example 3, set forth below, describes a specific example of manufacturing an embodiment of a battery cell utilizing the mixed cathode active material. With the foregoing in mind, the process 130 illustrated in FIG. 9 begins with mixing (block 132) the spray-dried NMC and the co-precipitated NMC together in a particular ratio (e.g., a 1:1 ratio) to form a mixed NMC component. The mixed NMC component may be combined with a conductive component (e.g., a conductive carbon component, such as graphene or graphite) a binder (e.g., polyvinylidene difluoride (PVDF)) and a diluent (e.g., N-methylpyrrolidone (NMP)) to form a slurry (block 134). The slurry may be cast (block 136) onto a surface of the cathode (e.g., an aluminum plate or foil). For embodiments of battery cells using a metal foil as the substrate for the cathode layer, the coated cathode may be calendared, folded, and pressed (block 138) to provide a desired electrode density and thickness. The resulting electrode may then be stacked (block 140) with one or more non-conductive layers (e.g., one or more polyimide layers) and an anode. Finally, the stacked structure may be disposed (block 142) in a metallic or polymeric housing, and the housing may be filled with an electrolyte prior to vacuum sealing to provide the battery cell.

EXAMPLE 3

Constructing a Pouch Battery Cell

For an embodiment of the process 130 illustrated in FIG. 9, a cathode active material composition was formed using 95 wt % mixed NMC component (e.g., a 1:1 mixture of spray-dried to co-precipitated NMC components), 3 wt % conductive carbon, and 2 wt % of PVDF binder to form a slurry in NMP. The slurry was cast onto an aluminum foil, followed by drying and calendaring of the foil. The dried, coated foil was then folded and pressed to obtain the desired electrode density and thickness. The resulting electrode was slitted and stacked with a non-conductive layer and a negative electrode (e.g., graphite or metal oxide). The stack was disposed within a non-conductive pouch housing (e.g., a polyimide bag) that was ultrasonically welded, filled with an electrolyte (e.g., containing carbonate solvents and LiPF6 as a salt), and vacuum-sealed to provide a pouch battery cell having a capacity of approximately of 1.25 Ah.

As set forth above, a battery cell utilizing a cathode active material having a mixture of spray-dried and co-precipitated NMC components may enable improved battery performance in terms of power and cycle life. Accordingly, FIGS. 10-13 include graphs illustrating measurements performed on the battery cell embodiment of example 3, as well as battery cells manufactured using only the spray-dried components or co-precipitated NMC components. It may be appreciated that the measurements illustrated in FIGS. 10-13 were generally performed according to "Battery Test Manual For Low-Energy Energy Storage System for Power-Assist Hybrid Electric Vehicles," Revision 0, published April 2013 by the U.S. Department of Energy and Idaho National Engineering and Environmental Laboratory (INEEL) (see, e.g., pages 12, 15, 51, and 33).

Figure 10:
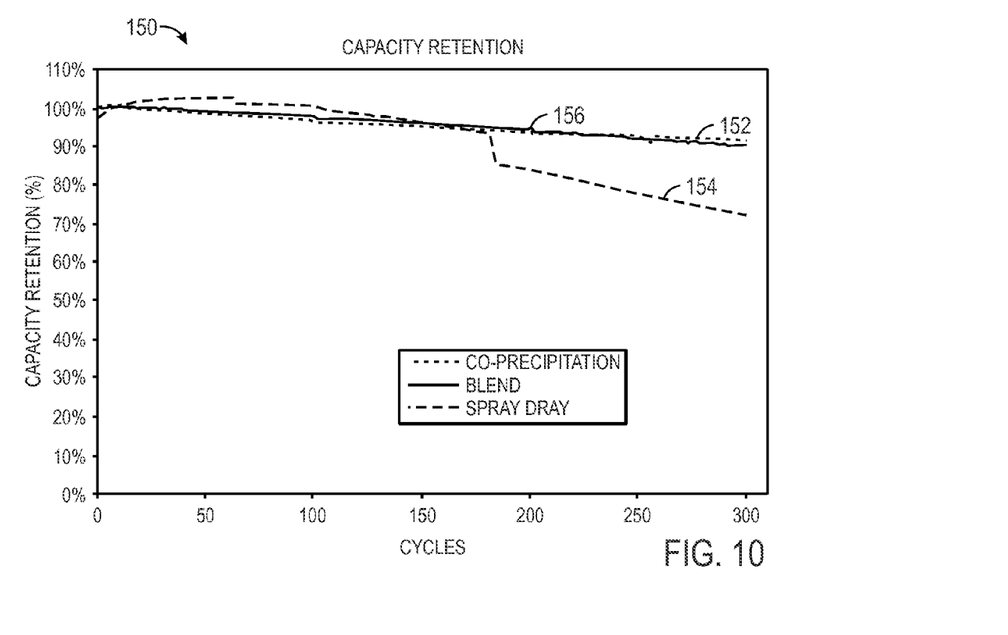
FIG. 10 is a graph illustrating the capacity retention measurements for embodiments of battery cells manufactured with a spray-dried cathode active material, with a co-precipitated cathode active material, and with a mixed cathode active material.

In particular, FIG. 10 includes a graph 150 illustrating capacity retention measurements (e.g., C/2 rate at approximately 45° C. and approximately 4.1 V) performed on a battery cell having only a co-precipitated cathode active material (represented by the line 152), a battery cell having only a spray-dried cathode active material (represented by the line 154), and the battery cell having a mixed cathode active material (represented by the line 156). As shown in the graph 150, the battery cell having only the spray-dried cathode active material (line 154) may general increase in capacity during the first approximately 150 cycles as the cathode active material traverses a "break-in" period; however, between approximately 150 and 200 cycles, the capacity retention of the battery cell may begin to decline as the cathode active material degrades. In contrast, as shown in the graph 150, the battery cell having the mixed cathode active material (line 156) and the battery cell having only the co-precipitated cathode active material (line 156) demonstrate similar capacity retention characteristics (e.g., approximately a 10% cycle fade or reduction in capacity retention over approximately 300 cycles). Accordingly, the battery cell having the mixed cathode active material (line 156) is robust and may enable battery cells having good capacity retention over the course of the life of the battery cell.

Figure 11:
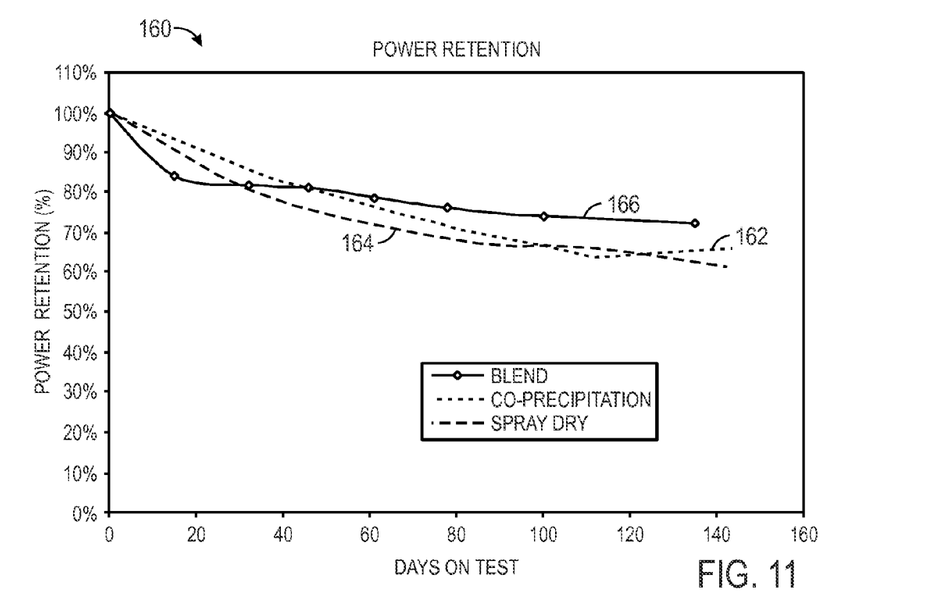
FIG. 11 is a graph illustrating the power retention measurements for embodiments of battery cells manufactured with a spray-dried cathode active material, with a co-precipitated cathode active material, and with a mixed cathode active material.

FIG. 11 includes a graph 160 illustrating power retention measurements performed on a battery cell having only a co-precipitated cathode active material (represented by the line 162), a battery cell having only a spray-dried cathode active material (represented by the line 164), and the battery cell having a mixed cathode active material (represented by the line 166). The power retention measurements may be performed as follows: charge the cell to 100% state-of-charge (SOC), then store the cell at 60° C. for 15 days, and then perform high pulse power characterization (HPPC) at 25° C. for 10 second pulses at 50% SOC. While the performance of the battery cells having only the co-precipitated cathode active material (line 162) and having only the spray-dried cathode active material (line 164) appear to provide better power retention over approximately the first 40 days of testing, the battery cell having the mixed cathode active material (line 166) outperformed the other two battery cells from approximately 50 days of testing onward. Accordingly, the battery cell having the mixed cathode active material enables improved power retention compared to battery cell having a non-mixed cathode active material. As such, the mixed cathode active material provides a more robust material that reduces cycle fade during cycling, even at high temperatures.

Figure 12:
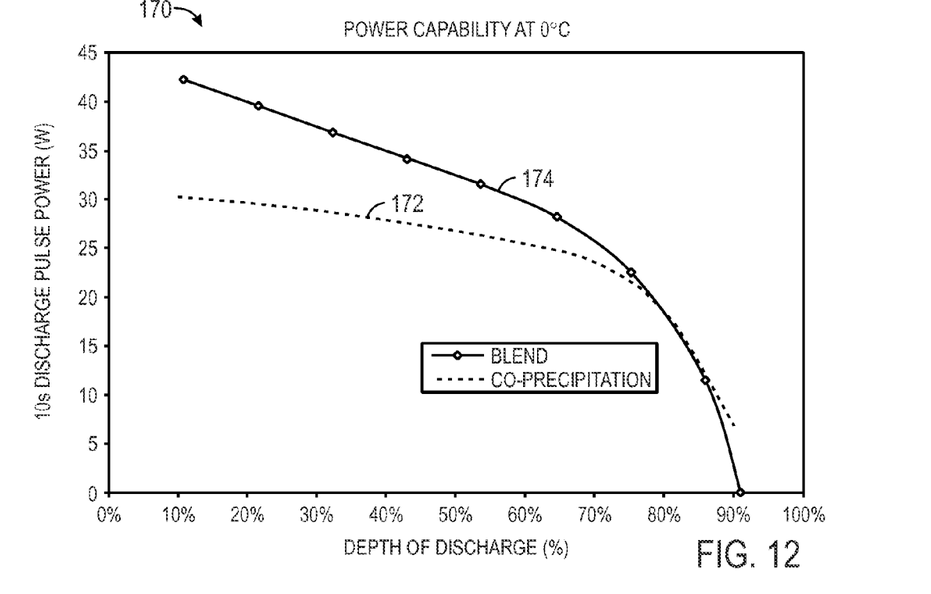
FIG. 12 is a graph illustrating the power capability at 0° C. for embodiments of battery cells manufactured with a co-precipitated cathode active material and with a mixed cathode active material.

FIG. 12 includes a graph 170 illustrating power capability measurements (e.g., 10 second pulse at 0° C.) performed on a battery cell having only a co-precipitated cathode active material (represented by the line 172) and the battery cell having a mixed cathode active material (represented by the line 174). As illustrated in the graph 170, over the range of the discharge depth (e.g., approximately 10% to approximately 90%) the battery cell having only the co-precipitated cathode active material (line 172) provides between approximately 30 W and approximately 7 W of power, while the battery cell having the mixed cathode active material (line 174) provides between approximately 42 W and approximately 0 W of power. Accordingly, the graph 170 indicates that the battery cell with the mixed cathode active material has significantly enhanced power at 0° C. (e.g., between approximately 10% and approximately 80% of the depth of discharge (DoD) region) compared to the battery cell with the co-precipitated cathode active material alone.

Figure 13:
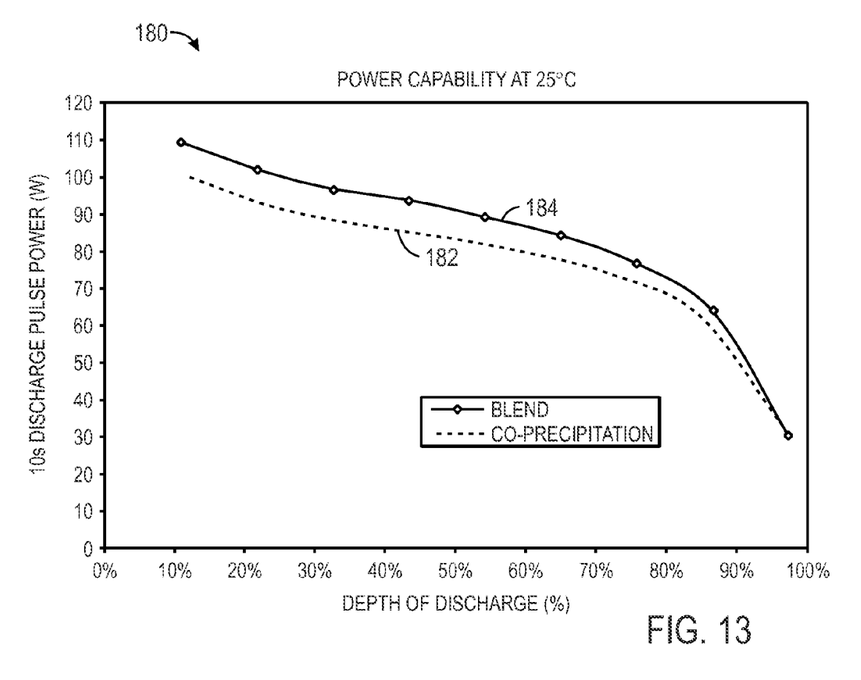
FIG. 13 is a graph illustrating the power capability at 25° C. for embodiments of battery cells manufactured with a co-precipitated cathode active material and with a mixed cathode active material.

FIG. 13 includes a graph 180 illustrating power capability measurements (e.g., 10 second pulse at 25° C.) performed on a battery cell having only a co-precipitated cathode active material (represented by the line 182) and the battery cell having a mixed cathode active material (represented by the line 184). As illustrated in the graph 180, over the range of the discharge depth (e.g., approximately 12% to approximately 95%) the battery cell having only the co-precipitated cathode active material (line 182) provides between approximately 100 W and approximately 30 W of power, while the battery cell having the mixed cathode active material (line 184) provides between approximately 110 W and approximately 30 W of power. Accordingly, the graph 180 indicates that the battery cell with the mixed cathode active material also has significantly enhanced power at 25° C. compared to the battery cell with the co-precipitated cathode active material alone. As such, the mixed cathode active material enables greatly improved power capability over a wide range of temperatures.

Examples are provided above for forming and using mixtures of LMO components that are, more specifically, spray-dried and co-precipitated (NMC) materials. It should be noted that the disclosed NMC materials are merely examples of LMO components. In certain embodiments, other mixtures of spray-dried and co-precipitated LMO materials (e.g., NCA, LCO, LMO-spinel, or another suitable LMO) may be used without spoiling the effect of the present approach.

One or more of the disclosed embodiments, alone or on combination, may provide one or more technical effects useful in the manufacture of cathodes and cathode materials for battery cells. For example, certain embodiments of the present approach may enable improved power capability of the battery cell at room temperature and at low temperatures. By specific example, mixing a co-precipitated LMO component and a spray-dried LMO component, as set forth above, may enable the manufacture of battery cells having significantly enhanced power, improved power retention, or both, compared to battery cells utilizing only a co-precipitated component or a spray-dried component. As such, the mixing these LMO components, as presently disclosed, may generally enable the production of a more robust cathode with less cycle fade and improved power capability over a wide range of temperatures. The technical effects and technical problems in the specification are exemplary and are not limiting. It should be noted that the embodiments described in the specification may have other technical effects and can solve other technical problems.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A lithium ion battery cell, comprising:
a cathode comprising an active material, wherein the active material comprises both a spray-dried lithium metal oxide (LMO) component and a co-precipitated LMO component, wherein the spray-dried and the co-precipitated LMO components are both lithium nickel manganese cobalt oxide (NMC) materials having the formula $LiNi_{1/3}Co_{1/3}Mn_{1/3}O_2$.

2. The battery cell of claim 1, wherein the active material has a surface area between approximately 0.4 square meter per gram ($m^2/g$) and approximately 1.2 $m^2/g$.

3. The battery cell of claim 1, wherein the spray-dried and the co-precipitated LMO components provide greater power retention together than the spray-dried LMO component or the co-precipitated LMO component alone.

4. The battery cell of claim 1, wherein the spray-dried and the co-precipitated LMO components provide less cycle fade together than the spray-dried LMO component alone.

5. The battery cell of claim 1, wherein the spray-dried and the co-precipitated LMO components provide a greater power output together than the co-precipitated LMO component alone.

6. The battery cell of claim 1, wherein the lithium ion battery cell comprises a cylindrical, prismatic, or pouch lithium ion battery cell.

7. The battery cell of claim 1, wherein the active material comprises at least 25% spray-dried LMO component by weight.

8. The battery cell of claim 1, wherein the active material comprises the spray-dried and the co-precipitated LMO components in approximately equal parts.

9. A method of making a cathode of a battery cell, comprising:
mixing a spray-dried lithium metal oxide (LMO) component and a co-precipitated LMO component, wherein the spray-dried the co-precipitated LMO components are both lithium nickel manganese cobalt oxide (NMC) materials having the formula $LiNi_{1/3}Co_{1/3}Mn_{1/3}O_2$; and
binding the mixed spray-dried and co-precipitated components to a metallic surface.

10. The method of claim 9, comprising forming the spray-dried LMO component using a spray-dry technique and forming the co-precipitated LMO component using a co-precipitation technique.

11. The method of claim 9, wherein the mixed spray-dried and co-Precipitated components comprise at least 25% co-precipitated LMO component by weight.

12. The method of claim 9, comprising forming a slurry comprising approximately 95 wt% of the mixed spray-dried and co-precipitated components, 3 wt % conductive carbon, and 2 wt % of polyvinylidene difluoride (PVDF) binder.

13. The method of claim 12, wherein binding the mixed spray-dried and co-precipitated components to the metallic surface comprises casting the slurry on the metallic surface and then drying the metallic surface.

14. The method of claim 9, comprising calendaring the metallic surface, folding, and pressing the metallic surface to a desired thickness and density to form the cathode of the battery cell.

15. The method of claim 9, comprising forming the battery cell by stacking the metallic surface with a polymer separator and a negative electrode, disposing the stack within a housing, filling the housing with an electrolyte, and vacuum-sealing the housing.

16. The method of claim 15, wherein the battery cell is configured to provide one or more of: greater power retention, greater power output, and less cycle fade than another battery cell with only the first or the second LMO component.

17. A material, comprising:
a mixture of a spray-dried lithium metal oxide (LMO) component and a co-precipitated LMO component, wherein the spray-dried and the co-precipitated LMO components are both lithium nickel manganese cobalt oxide (NMC) materials having the formula $LiNi_{1/3}Co_{1/3}Mn_{1/3}O_2$.

18. The material of claim 17, wherein the material comprises about a 1:1 mixture of the spray-dried and the co-precipitated LMO components.

19. The material of claim 17, wherein the material comprises a binder and a conductive component.

20. The material of claim 19, wherein the material comprises 2 wt % binder and 3 wt % conductive component.

21. The material of claim 19, wherein the binder comprises polyvinylidene difluoride (PVDF) and the conductive component comprises conductive carbon.

* * * * *

UNITED STATES PATENT AND TRADEMARK OFFICE
CERTIFICATE OF CORRECTION

PATENT NO. : 9,446,963 B2
APPLICATION NO. : 13/910672
DATED : September 20, 2016
INVENTOR(S) : Sung-Jin Cho et al.

It is certified that error appears in the above-identified patent and that said Letters Patent is hereby corrected as shown below:

On the Title Page

In Item (73), under "Assignee", in Column 1, Line 1, delete "Johnson Controls Technology Company, Holland, MI (US)" and insert -- Johnson Controls Technology LLC, Wilmington, DE (US) --, therefor.

Signed and Sealed this
Twenty-third Day of July, 2019

Andrei Iancu
*Director of the United States Patent and Trademark Office*